United States Patent [19]
Knoedel et al.

[11] Patent Number: 5,463,911
[45] Date of Patent: Nov. 7, 1995

[54] ACTUATION APPARATUS FOR A GEARSHIFT SLEEVE IN A STEPPED AUTOMOTIVE GEARBOX

[75] Inventors: Gunter Knoedel, Muehlacker; Reinhard Schaarschmidt, Illingen, both of Germany

[73] Assignee: GETRAG Gestriebe-und Zahnradfabrik Hermann Hagenmeyer GmbH & Cie, Germany

[21] Appl. No.: 271,453

[22] Filed: Jul. 7, 1994

[30] Foreign Application Priority Data

Jul. 7, 1993 [DE] Germany ............... 43 22 586.1

[51] Int. Cl.⁶ ............... F16H 63/32; G05G 3/00
[52] U.S. Cl. ............... 74/473 R
[58] Field of Search ............... 74/473 R; 192/82 R

[56] References Cited

U.S. PATENT DOCUMENTS

| | | | |
|---|---|---|---|
| 1,774,026 | 8/1930 | Manville | 74/473 R |
| 4,353,449 | 10/1982 | Lamy et al. | 74/473 R |
| 4,501,540 | 2/1985 | Kako et al. | 425/116 |
| 4,548,253 | 10/1985 | Funatani et al. | 164/80 |
| 5,027,672 | 7/1991 | Salvatori et al. | 74/473 R |

FOREIGN PATENT DOCUMENTS

| | | | |
|---|---|---|---|
| 477062A | 3/1992 | European Pat. Off. | 74/473 R |
| 2640777A | 6/1990 | France | 74/473 R |
| 144580 | 11/1979 | Japan | 74/473 R |
| 218522 | 12/1984 | Japan | 192/82 R |
| 35925 | 2/1987 | Japan | 74/473 R |
| 5248539 | 9/1993 | Japan | 74/473 R |

OTHER PUBLICATIONS

"Handbuch der Kraftfahrzeugtechnik" (Automotive engineering manual) by Buschmann, Koessler; Heyne-Verlag München, 1973, pp. 557 to 558.

Primary Examiner—Richard M. Lorence
Assistant Examiner—Troy E. Grabow
Attorney, Agent, or Firm—Cooley Godward Castro Huddleson & Tatum

[57] ABSTRACT

A gearshift sleeve actuating apparatus for a stepped automotive gearbox is disclosed. The apparatus comprises a shift rod which can be displaced along its axis. A shift fork and an engaging piece or driver are rigidly arranged on the shift rod. The apparatus is configured as a composite plastic/metal structure in which a metal component, constituting the engaging piece as well as a core for the shift rod, is injection-embedded in a plastic material. The shift fork consists exclusively of the plastic material.

13 Claims, 3 Drawing Sheets

ACTUATION APPARATUS FOR A GEARSHIFT SLEEVE IN A STEPPED AUTOMOTIVE GEARBOX

BACKGROUND OF THE INVENTION

1. Field of the Invention

The invention relates to the field of stepped automotive gearboxes or transmissions. In particular, the invention relates to an apparatus for actuating a gearshift sleeve in a stepped automotive gearbox, with a gearshift rod which can be displaced along its axis and on which a shift fork and an engaging piece or driver are rigidly arranged. The engaging piece, in turn, cooperates with a cam being actuated by the driver of the vehicle through a standard gearshift lever.

2. Description of the Prior Art

Actuation apparatuses of the aforesaid kind are generally known, for example from the German book "Handbuch der Kraftfahrzeugstechnik (Automotive engineering manual)" by Buschmann, Koessler; Heyne-Verlag München, 1973, pages 557 to 558.

The known actuation apparatuses are composed of a plurality of metal components. A metal shift fork is typically used, and is provided by means of machining on the one hand with the necessary catches for the axial displacement travel of the shift rod and to prevent double shifting, but on the other hand also with recesses for mechanical mounting of the shift fork and the driver. The driver is typically also a multipart component that is fitted onto the shift rod before assembly and then fastened nonrotatably onto the shift rod, for example by pinning. With conventional apparatuses the shift fork is typically a cast metal part, for example a cast aluminum part, whose guide for the sliding sleeve, namely an annular shoulder in the form of a circular segment, also must be brought to the required dimension by machining before the shift fork is fastened on the shift rod, for example again by pinning.

Actuation apparatuses of this kind are therefore relatively complex to produce, since a whole series of individual parts must be processed and fitted before the apparatus is ready for installation.

The underlying object of the invention, however, is to develop an apparatus of the aforesaid kind in such a way that simpler production, and thus a drastic reduction in the cost of production, are possible.

SUMMARY OF THE INVENTION

The present invention provides an improved apparatus for actuating a gearshift sleeve in a stepped automotive gearbox and comprises:

- a gearshift rod having an axis and being adapted to be displaced along the axis and having, further, an elongate axial reinforcing metallic core embedded in a plastic material;
- a plastic material gearshift fork rigidly connected to the gearshift rod; and
- a metallic engaging piece adapted to be engaged by a cam actuated by a gearshift lever of the gearbox, the engaging piece being rigidly connected to the gearshift rod, wherein the apparatus is configured as a composite plastic/metal structure having a metallic component constituting the core and the engaging piece as an integral component and being embedded by injection molding in the plastic material, the gearshift fork consisting exclusively from the plastic material.

The underlying object of the invention is completely achieved in this manner.

Specifically, production of the apparatus as a composite plastic/metal component results in drastic simplification and thus decreased cost of production, since the metal part, which can be designed in simple fashion as a stamping, merely needs to be placed in an injection-molding die, while the embedded composite component is then immediately ready for installation. All further processing and fitting steps necessary with conventional apparatuses are therefore superfluous. Moreover, with modern plastic injection molding methods, composite components of this kind can be produced so accurately that for the present application the part is already available with a dimensional accuracy which makes it immediately ready for installation.

The invention thus makes use of a technology, namely the production of composite plastic/metal components, that is previously known but was not obvious in the art of automotive multiple-ratio transmissions. For one thing, plastic parts are unknown as active components in multiple-ratio transmissions of this kind, since the previous opinion was that the mechanical and thermal properties of plastics could not withstand the operating conditions in an automotive multiple-ratio transmission. In addition, the substitution of a plastic component or a composite plastic/metal component for a conventional metal component is always associated with an increase in physical volume, since larger dimensions, as compared with exclusively metal components, are needed to achieve the same mechanical stability in components made entirely or partly of plastic. However, this increase in component dimensions contradicts the general development trend in components for automotive multiple-ratio transmissions, in which the constant preoccupation is to make components smaller in all circumstances. For this reason as well, it was not obvious to replace an active metal component of an automotive multiple-ratio transmission with a composite plastic/metal component.

As already mentioned, the invention has the substantial advantage of a drastic reduction in the work and cost outlay to produce actuation apparatuses of this kind. Calculations have indicated that the production costs of actuation apparatuses of this kind can be decreased to less than half with the use of the present invention, and even possibly to a third. Since automotive multiple-ratio transmissions are units that are produced in large numbers, very substantial savings and cost advantages can be achieved in this manner. This is another reason why the subject of the present invention was not obvious, since in mechanical engineering in general, and also in the design of transmissions for motor vehicles, great attention has been paid to production costs for some time, and it may therefore be considered surprising that a most unusual cost reduction can be attained in an important transmission element by means of the features of the invention, a reduction that will also be clearly reflected in the total selling price of the transmission.

In a preferred embodiment of the apparatus according to the invention, the plastic is a polyamide, the plastic preferably being glass fiber-reinforced.

It has been found that plastics of this kind are of particular advantage for the application of interest here, since they can be regarded as particularly long-lived at the high temperatures and high mechanical stresses that occur in an automotive multiple-ratio transmission. A glass fiber-reinforced polyamide available commercially under the name ZYTEL (registered trademark of the DuPont company) has proven to be particularly suitable in this context.

In a preferred embodiment of the invention, the sections of the metal part forming the core of the shift rod are configured as a flat rectangular-profile material.

This feature has the aforesaid advantage that the part can be produced as a simple stamping.

In a preferred development of this variant, the sections of the metal part are provided with an undulating edge profile.

The advantage of this feature is that the mechanical stability of the apparatus is increased.

In a further exemplary embodiment of the invention, the shift rod is enlarged in the axial section of the shift fork.

This feature also has the advantage of improving the stability of the apparatus. A further substantial advantage of the invention is evident in this exemplary embodiment: With conventional apparatuses—which, as explained, are fitted together from a plurality of metal components—the shift fork has a reduced cross section at the point where the driver is put in place. This leads to a weakening of the shift fork. The apparatus according to the invention, however, not only has the advantage of being a single part, but can moreover be enlarged in the section onto which the shift fork is placed and which is subject to particular mechanical axial stress, so that shifting forces can be applied reliably even over long-term service.

In a preferred development of this exemplary embodiment, the enlargement is substantially formed by the fact that a plurality of radial ribs is provided in the axial section.

The advantage of this feature is that high stability is achieved using little material and therefore with little weight.

In a particularly preferred group of exemplary embodiments of the invention, the shift fork is configured with a honeycomb structure having a plurality of chambers separated from one another by partitions.

This feature again has the advantage that maximum strength can be achieved with minimal use of material.

With this exemplary embodiment, it is especially preferred if the honeycomb structure has a form which, proceeding radially from the shift fork, first becomes wider and then tapers down again.

This configuration of the structure has proven particularly advantageous in terms of high mechanical stability.

In a further variant of this exemplary embodiment, in which the shift fork has, in a known manner, a shoulder in the shape of a circular segment for engagement into the sliding sleeve, the shoulder is supported at least partly by the honeycomb structure.

The advantage of this feature is that only a small dimension is present in the immediate engagement region between the shift fork and sliding sleeve, while otherwise the shift fork is optimally supported by the honeycomb structure.

In this exemplary embodiment, it is particularly preferred if the honeycomb structure comprises at most two chambers, each separated by a partition, in the axial direction; and if the shoulder aligns radially with the partition.

The advantage of this feature is first that it results in a particularly simple solution in terms of injection molding engineering, which can easily be unmolded to either side. In addition, alignment between the shoulder and the partition results in a particularly stable structure.

In this exemplary embodiment it is further preferred if the shoulder is supported over a portion of its circumference by a chamber extending substantially radially.

The advantage of this feature is that a large circumferential angle for the shoulder and therefore for the shift fork can be achieved without losing stability.

Further exemplary embodiments of the invention with honeycomb structure are characterized by the fact that all partitions are implemented with the same thickness.

The advantage of this feature is that maximum strength results with minimum use of material; and further that the resulting structure can be calculated with comparatively simple means using a finite-element calculation method.

Further advantages are evident from the description and the attached drawings.

It is understood that the features mentioned above and those yet to be explained below can be used not only in the respective combinations indicated, but also in other combinations or in isolation, without leaving the scope of the present invention.

BRIEF DESCRIPTION OF THE DRAWINGS

An exemplary embodiment of the invention is depicted in the drawings, and will be explained in more detail in the description below. In the drawings.

DESCRIPTION OF THE PREFERRED EMBODIMENT

Figure 1:
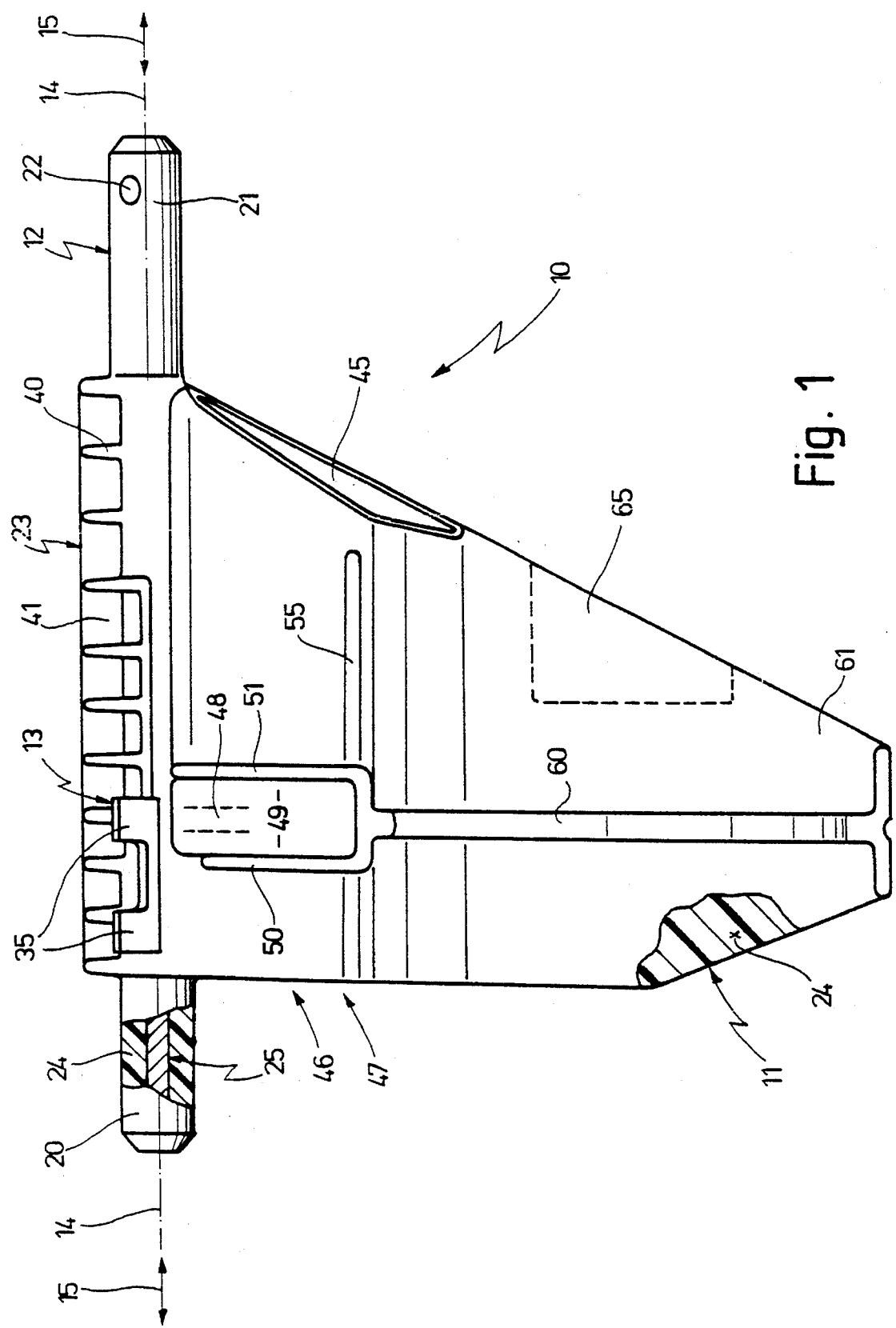
FIG. 1 shows a view in the radial direction of an exemplary embodiment of an actuation apparatus according to the invention.
Figure 2:
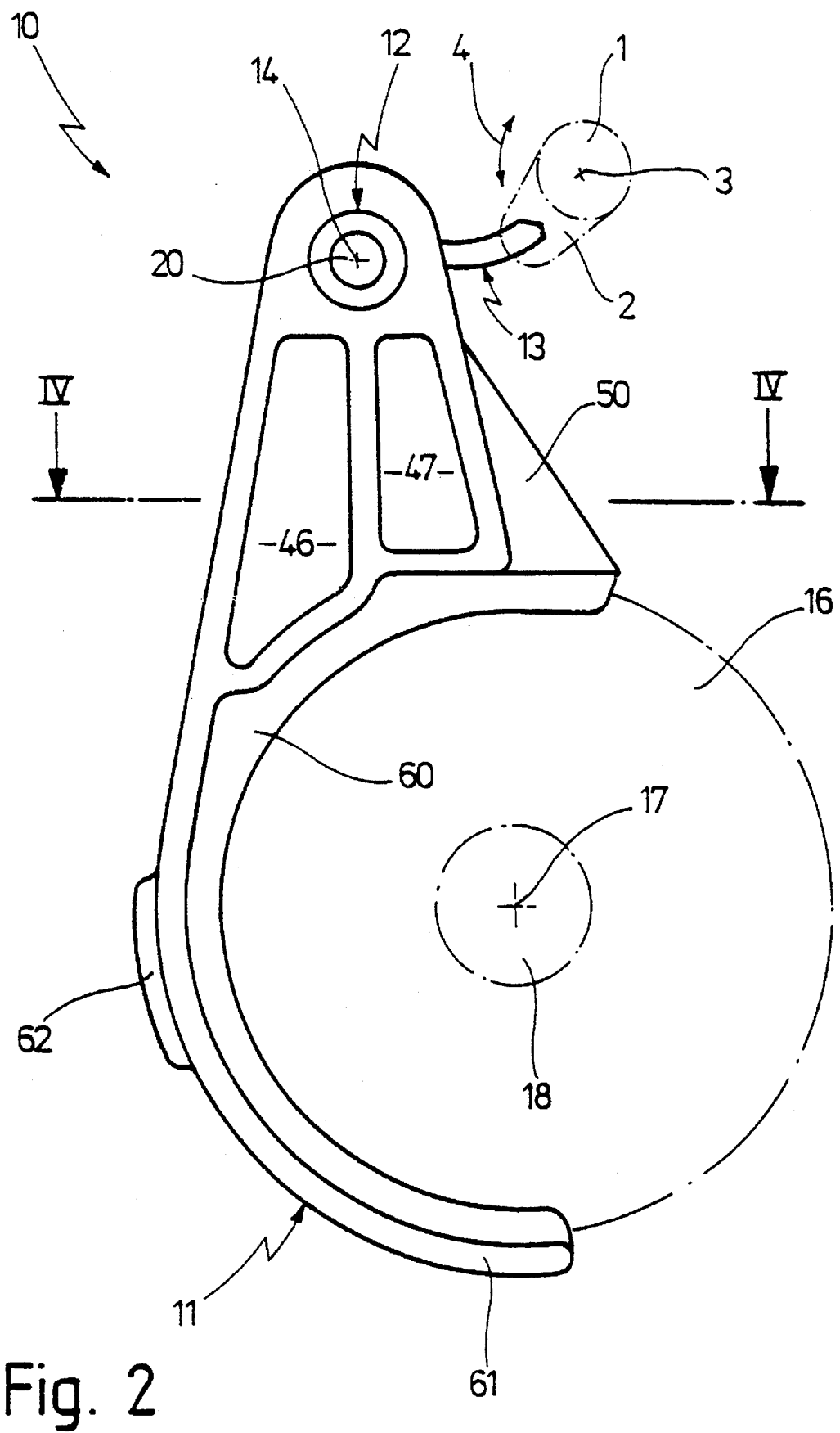
FIG. 2 shows the apparatus according to FIG. 1, but in an axial side view.

FIGS. 1 and 2 depict an exemplary embodiment of the invention in an overall view.

FIG. 2 shows a first shift rod 1 that has a laterally projecting cam or first driver 2. The first shift rod 1 can be displaced perpendicular to the plane of FIG. 2 along a first axis 3, and additionally can rotate about the first axis 3 in the direction of an arrow 4.

Movement of the first shift rod 1 is derived directly from the gear selector lever of a motor vehicle. Rotation about the first axis corresponds to selection of the individual shift gates, while movement along the first axis 3 corresponds to movement of the selector lever within the shift gate; usually two gears can be selected at two end positions.

An actuation apparatus 10 is used to engage the gears of the automotive multiple-ratio transmission. The actuation apparatus 10 comprises a shift fork 11 that sits on a second shift rod 12. The second shift rod 12 also carries a second driver 13 or engaging piece. The number 14 designates a second axis that is also the axis of the second shift rod 12.

In FIG. 1, arrows 15 indicate that the second shift rod can be displaced in the axial direction. The second shift rod 12 cannot, however, be rotated in the rotary direction.

In FIG. 2, 16 indicates a gearshift or sliding sleeve of the automotive multiple-ratio transmission. The sliding sleeve 16 can be displaced axially along a third axis 17, from a neutral center position into two end positions opposite one another relative to the center position, each of which corresponds to one gear of the multiple-ratio transmission. The number 18 indicates a drive shaft of the multiple-ratio transmission, with which a nonrotating connection is made or unmade when the gear is engaged.

Leaving aside the special features described below, the actuation apparatus 10 is thus a conventional actuation apparatus for an automotive multiple-ratio transmission. The three axes 3, 14, 17 lie parallel to one another, and actuation of the first shift rod 1 by the selector lever—i.e. rotation of the first shift rod 1 in the direction of arrow 4, as well as subsequent axial movement of the first shift rod 1 and thus, via the drivers 2 and 13, of the second shift rod 12—leads to axial displacement of the sliding sleeve 16 and therefore to engagement or disengagement of a transmission gear.

The special features of the actuation apparatus 10 are as follows:

The actuation apparatus 10 is configured overall as a composite plastic/metal component.

For this purpose, the actuation apparatus 10 is made substantially of a plastic, as will be explained below.

In FIG. 1, 20 and 21 indicate lateral two stub shafts of the actuation apparatus 10, which are mounted in the transmission housing in a manner not shown in greater detail. A catch 22 is evident on one stub shaft, specifically stub shaft 21. The catch 22 is shaped into the plastic as, for example, a cap. The catch 22 serves, in a known manner, to mutually lock together two parallel shift rods 12 by means of a lateral locking pin which, when a shift rod parallel to the second shift rod 12 is actuated, engages in the catch 22 and thus prevents axial displacement of the second shift rod 12.

Further catches of this kind can be applied on the side of the actuation apparatus 10 that lies opposite in FIG. 1, for example spring-loaded ball catches that provide reversible immobilization, in particular pressure-point immobilization, of the second shift rod 12 in the center axial neutral position and/or the two opposite axial end positions.

In the center of the actuation apparatus 10, i.e. between the two stub shafts 20 and 21, the second shift rod 12 is configured as a fork section 23. The fork section 23 is enlarged in the region near the shaft, and in the region remote from the shaft narrows into the actual fork, as will be explained below.

It has already been mentioned that the actuation apparatus 10 is a composite plastic/metal component which is thus made substantially of plastic 24, as is clearly evident from the cutaway views of FIG. 1.

A metal part 25 is provided solely in the region of the second shift rod 12.

Figure 3:
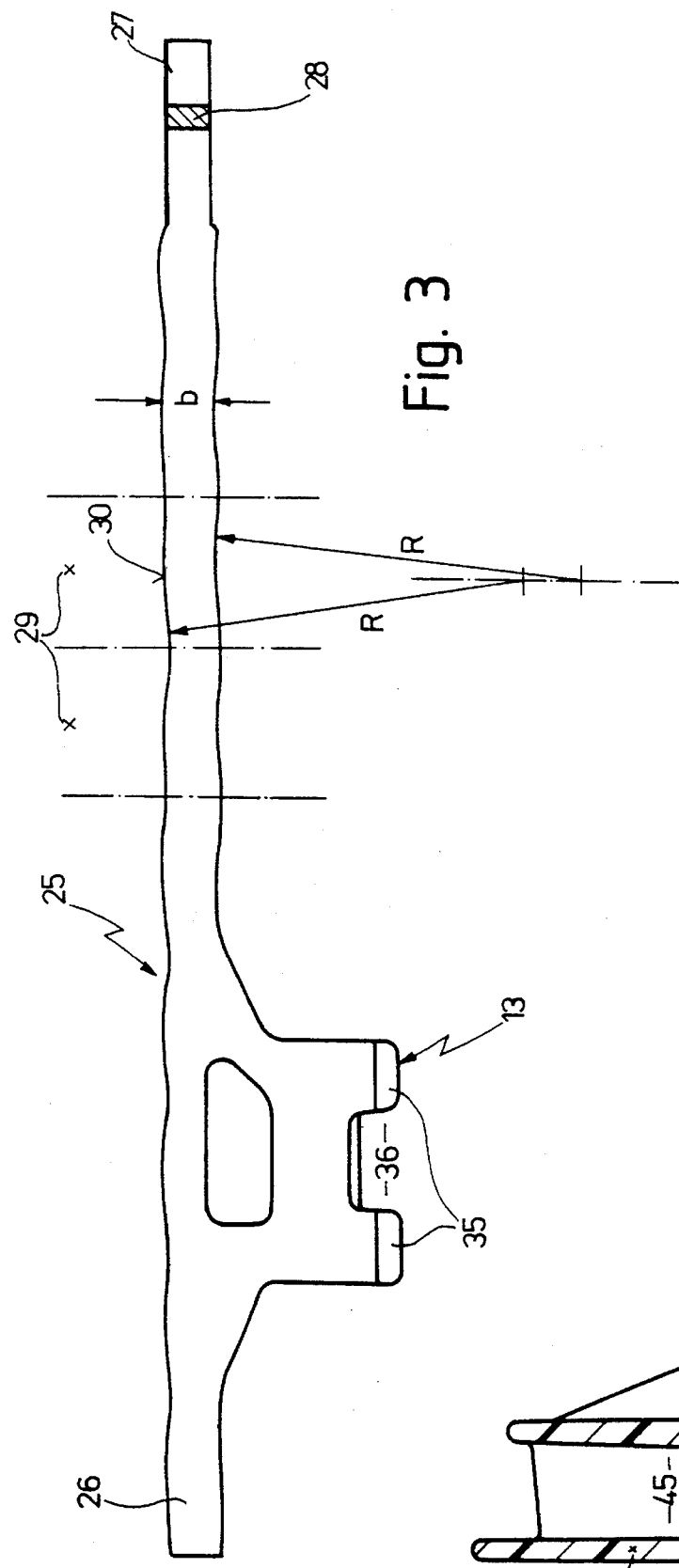
FIG. 3 shows a radial side view of a metal part as utilized in the exemplary embodiment of FIGS. 1 and 2.

As the magnified depiction of FIG. 3 shows, the metal part 25 has a left end 26 and a right end 27, each having a flat rectangular cross section as indicated at 28.

These elongated sections of the metal part 25 are divided axially into segments 29. Each segment 29 corresponds to a crest and a trough of an undulating profile 30, which is configured so that the width b of the metal part 25 is always constant in the plan view of FIG. 3. To form the undulating profile 30, sections of the two sides are each configured in approximate arcs of a circle, as indicated by radii of curvature R.

The metal part 25 is enlarged only in the vicinity of the left end 26, and is provided there with the second driver 13. The second driver 13 has a U-shaped, i.e. fork-like, structure. For this purpose, the second driver 13 is provided with two spaced-apart teeth 35, between which a space 36 is left. The space 36 is such that the first driver can receive] two of the first shift rod 1 therein with almost a perfect fit.

The second driver 13 can be slightly offset in an axial view, as is clearly evident from FIG. 2.

Except for the metal part 25, the actuation apparatus 10 is made exclusively of the plastic 24.

Thus in order to produce the actuation apparatus 10, the prefabricated metal part 25 is placed in a suitable injection molding die of an injection molding machine, and then injection-embedded in the plastic 24. Thus the entire external shape of the actuation apparatus 10 is defined by the injection molding die.

It has already been mentioned that the fork section 23 is enlarged in the region near the shaft. Provided for this purpose are ribs 40 that are distributed axially along the fork section 23 and can extend in a quarter-circle, half-circle, and three-quarter circle around the second axis 14. In addition to the radial ribs 40, one or more axially extending ribs 41 can also be provided.

The region of the fork section 23 remote from the shaft consists, over approximately half the total radial extent, of a honeycomb structure. This is understood to mean a structure with a plurality of hollow chambers separated from one another by partitions.

Figure 4:
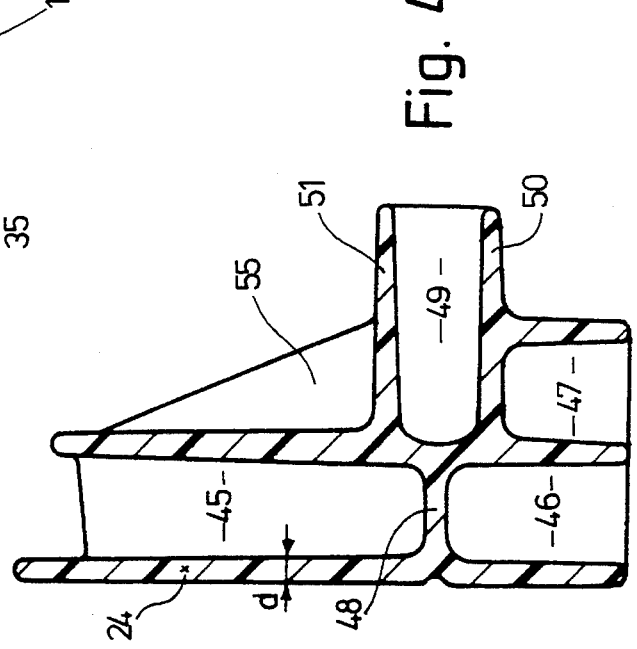
FIG. 4 shows a sectioned view along line IV—IV of FIG. 2.

In the exemplary embodiment shown, as is evident especially from the sectioned depiction of FIG. 4, there is first provided a first axial chamber 45, which lies opposite a second axial chamber 46. A third, also axial chamber 47 is indicated alongside the second axial chamber 46. The first chamber 45 and second chamber 46 are separated from one another by a partition 48. Their boundary walls 50, 51 impart to the fourth chamber 49 a substantially triangular cross section, as is evident from FIG. 2. The boundary walls 50, 51 serve at the same time as radial transverse ribs. A lengthwise rib 55, also triangular, is formed on the upper side of the first chamber 45 onto the boundary wall 51 of the fourth chamber 49 in the axial direction.

It is evident from the depiction of FIG. 4 that the thickness d of all the boundary walls 48, 50, 51, etc. is approximately the same.

The function of the shift fork 11 is realized substantially by a shoulder 60 in the shape of a circular segment, a principle also encountered in conventional shift forks. The shoulder 60 extends over approximately a third of its circumference along the honeycomb structure described in detail earlier. As is clearly evident from the depiction of FIG. 1, the shoulder 60 is aligned in a radial plane with the partition 48 and therefore also with the fourth chamber 49.

The radially outer two thirds of the circumference of the shoulder 60 are retained by a flange 61 that substantially has a surface which lies on an imaginary circular cylinder, but tapers radially outward as clearly shown in FIG. 1. The flange 61 can be provided on its outer side (cf. FIG. 2) with one or more reinforcing ribs 62. One or more reinforcing beads 65 can also be provided on the flange 61.

The operation of the actuation apparatus 10 when installed corresponds entirely to that of conventional actuation apparatuses that are fitted together from a plurality of individual metal parts. This provision is made deliberately, since the actuation apparatus 10 is otherwise intended to entail no changes in the design of the transmission. Unmodified shift linkages and even unmodified sliding sleeves 16 are also intended to be usable in the transmission.

Although the actuation apparatus 10 is made predominantly of plastic 24, and only a comparatively small metal part 25 is provided for the second driver 13 (which is under particular mechanical stress) and as the core of the second shift rod 12, practical tests have shown that the actuation apparatus 10 is nonetheless at least equivalent, if not indeed superior, to conventional actuation apparatuses made of individual metal parts. In long-term testing, for example, actuation apparatuses 10 according to the invention were subjected to several hundred thousand shift actuations; in addition, shift actuations were performed with shifting forces much higher than those present in real-world shifting. It was found that actuation apparatuses 10 according to the invention withstood these stresses, and practically no signs of wear occurred.

We claim:

1. A gearshift sleeve actuating apparatus for a stepped automotive gearbox, the apparatus comprising:

a gearshift rod having an axis and being adapted to be displaced along said axis, and having, further, an elongate axial reinforcing metallic core embedded in a plastic material;

a plastic material gearshift fork rigidly connected to said gearshift rod; and a metallic engaging piece adapted to be engaged by a cam actuated by a gearshift lever of said gearbox, said engaging piece being rigidly connected to said gearshift rod, wherein said apparatus is configured as a composite plastic/metal structure having a metallic component constituting said core and said engaging piece as an integral component and being embedded by injection molding in said plastic material, said gearshift fork being formed entirely of said plastic material.

2. The apparatus of claim 1, wherein said plastic material is polyamide.

3. The apparatus of claim 1, wherein said plastic material is glass fiber reinforced.

4. The apparatus of claim 1, wherein first sections of said metallic component forming said core of said shift rod are configured as a flat rectangular-profile material.

5. The apparatus of claim 4, wherein said first sections are provided with an undulating edge profile.

6. The apparatus of claim 1, wherein said shift rod has a second section, said shift fork being provided at said second section, said second section having, further, an enlarged cross-section.

7. The apparatus of claim 6, wherein said enlarged second section is formed by a plurality of radial ribs.

8. The apparatus of claim 1, wherein said shift fork is configured with a honeycomb structure having a plurality of chambers separated from one another by partition walls.

9. The apparatus of claim 8, wherein said honeycomb structure first becomes wider in cross-section and then tapers down again when proceeding in a radial direction from said shift rod axis.

10. The apparatus of claim 8, wherein said shift fork has a circular segment shoulder for engagement with a gearshift sleeve, said shoulder being supported by said honeycomb structure.

11. The apparatus of claim 10, wherein said honeycomb structure in an axial direction comprises a maximum of two chambers each separated by a partition wall, said shoulder being radially aligned with said partition wall.

12. The apparatus of claim 10, wherein said shoulder is circumferentially supported by a chamber extending substantially radially.

13. The apparatus of claim 8, wherein all partition walls have the same thickness.

* * * * *